United States Patent
Woodruff et al.

(10) Patent No.: US 9,438,705 B2
(45) Date of Patent: Sep. 6, 2016

(54) COMMUNICATION AND MESSAGE-EFFICIENT PROTOCOL FOR COMPUTING THE INTERSECTION BETWEEN DIFFERENT SETS OF DATA

(71) Applicant: International Business Machines Corporation, Armonk, NY (US)

(72) Inventors: David P. Woodruff, Mountain View, CA (US); Grigory Yaroslavtsev, State College, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 459 days.

(21) Appl. No.: 14/107,097

(22) Filed: Dec. 16, 2013

(65) Prior Publication Data

US 2015/0172425 A1   Jun. 18, 2015

(51) Int. Cl.
G06F 7/04 (2006.01)
G06F 17/30 (2006.01)
H04L 29/06 (2006.01)

(52) U.S. Cl.
CPC ......... *H04L 69/26* (2013.01); *G06F 17/30017* (2013.01); *G06F 17/30283* (2013.01); *G06F 17/30312* (2013.01); *H04L 69/166* (2013.01)

(58) Field of Classification Search
None
See application file for complete search history.

(56) References Cited

U.S. PATENT DOCUMENTS

| | | | |
|---|---|---|---|
| 2008/0071900 A1* | 3/2008 | Hecker | H04L 41/0893 709/223 |
| 2011/0141122 A1* | 6/2011 | Hakura | G06T 1/00 345/505 |
| 2012/0158774 A1 | 6/2012 | Balkesen et al. | |

OTHER PUBLICATIONS

Chor, Benny et al, "Achieving Independence in Logarithmic Number of Rounds," Proceeding PODC '87 Proceedings of the sixth annual ACM Symposium on Principles of distributed computing pp. 260-268, "http://www.acm.org/publications" ACM New York, NY, USA, 1987.*

Shannon, C.E., "A Mathematical Theory of Communication," ACM SIGMOBILE Mobile Computing and Communications Review, "http://www.acm.org/sigmobile/" Homepage Hyperlink "citation.cfm?id=J548&picked=prox&cfid=780127043&cftoken=57234173" archive vol. 5 Issue 1, Jan. 2001 pp. 3-55 Hyperlink "http://www.acm.org/publications" ACM New York, NY, USA.*

Kushilevitz, E. and Wienreb, E., "The Communication Complexity of Set-Disjointness with Small Sets and 0-1 Intersection", Foundations of Computer Science, 2009. FOCS '09. 50th Annual IEEE Symposium on Foundations of Computer Science, Oct. 25-27, 2009, pp. 63-72.

* cited by examiner

*Primary Examiner* — Bruce Moser
(74) *Attorney, Agent, or Firm* — Cantor Colburn LLP

(57) ABSTRACT

Embodiments relate to data processing. A method includes analyzing a plurality of data items in a relational database, where different portions of the data items are stored in a plurality of servers. The method also includes determining a maximum size of a subset of the data items stored in each of at least two servers among the plurality of servers, calculating a logarithm function based on the maximum size of the subset of the data items in each of the two servers, and calculating a highest number of sequences of communications between the two servers such that when the logarithmic function is iteratively applied, a value of the logarithmic function remains smaller than one. A protocol is then generated between the two servers for performing an intersection operation using the highest number of sequences calculated.

20 Claims, 3 Drawing Sheets

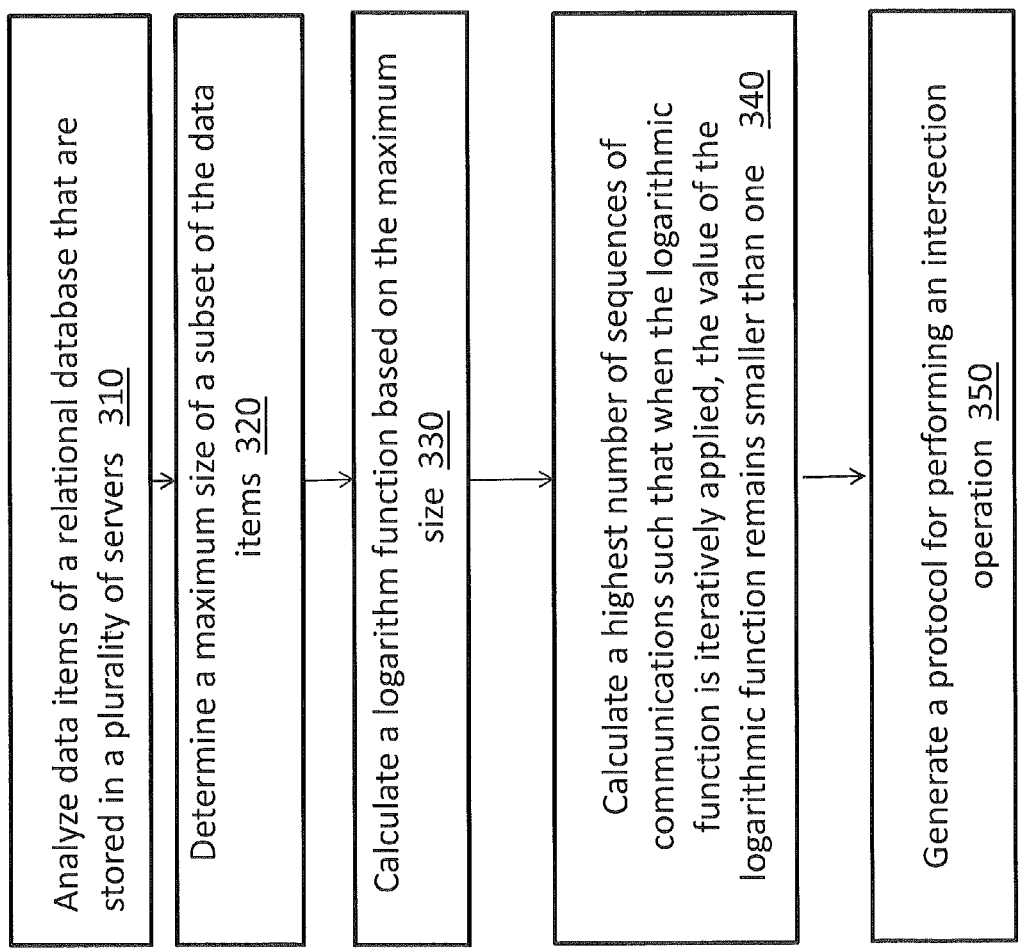

COMMUNICATION AND MESSAGE-EFFICIENT PROTOCOL FOR COMPUTING THE INTERSECTION BETWEEN DIFFERENT SETS OF DATA

BACKGROUND

The present disclosure relates generally to relational databases, and more particularly, to providing a message efficient protocol for computing two or more sets of data in a relational database.

A relational database is a database that has a collection of tables of data items. In conventional relational databases, the database is described and organized according to a relational model. A database management system (DBMS) is often used to handle a relational database.

Many relational databases use structured query language (SQL) or use SQL-type terminology or operations. In such a case, a relation can be defined as a set of tuples with the same attributes. A tuple represents an object and information about that object. A relation is usually described as a table, which is organized into rows and columns. The columns are often referenced as a primary key to uniquely identify each row. Rows in one table can relate by establishing a foreign key, a column or group of columns that points to the primary key of another table. All the data referenced by an attribute are in the same domain and conform to the same constraints. Applications access data usually by specifying queries and relations can be modified using the insert, delete, and update operators. Tuples by definition are unique.

A relational database may be stored in one memory location or computer. However, in sophisticated systems and where the relational database is large and complex, a series of computers or servers may be needed to store the different parts of the relational database. In such cases, it is important for the servers to communicate in an optimal manner to retrieve and manipulate the data that is stored in the plurality of servers.

SUMMARY

Embodiments include a method, system, and computer program product for data processing. The method includes analyzing a plurality of data items in a relational database. Different portions of the data items are stored in a plurality of servers. The method also includes determining a maximum size of a subset of the data items stored in each of at least two servers among the plurality of servers, calculating a logarithm function based on the maximum size of the subset of the data items in each of the two servers, and calculating a highest number of sequences of communications between the two servers such that when the logarithmic function is iteratively applied, a value of the logarithmic function remains smaller than one. A protocol is then generated between the two servers for performing an intersection operation using the highest number of sequences calculated. The intersection operation determines common data items stored in the two servers through the communications between the two servers such that a number of times the communications are exchanged does not exceed the highest number of sequences calculated.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 3 depicts a process flow for finding an intersection between different sets of data in a relational database in accordance with an embodiment.

DETAILED DESCRIPTION

In an embodiment, an efficient communication and message protocol for handling database operations with accuracy and speed is provided. Where data items in a relational database are assigned to multiple servers, the protocol is generated for calculating an intersection operation using a greatest number of sequences calculated by the system. The intersection operation determines common data items assigned to the servers through communication therebetween such that a number of times messages are exchanged in the communication does not exceed the highest number of sequences calculated. These and other features of the embodiments will now be described.

Figure 1:
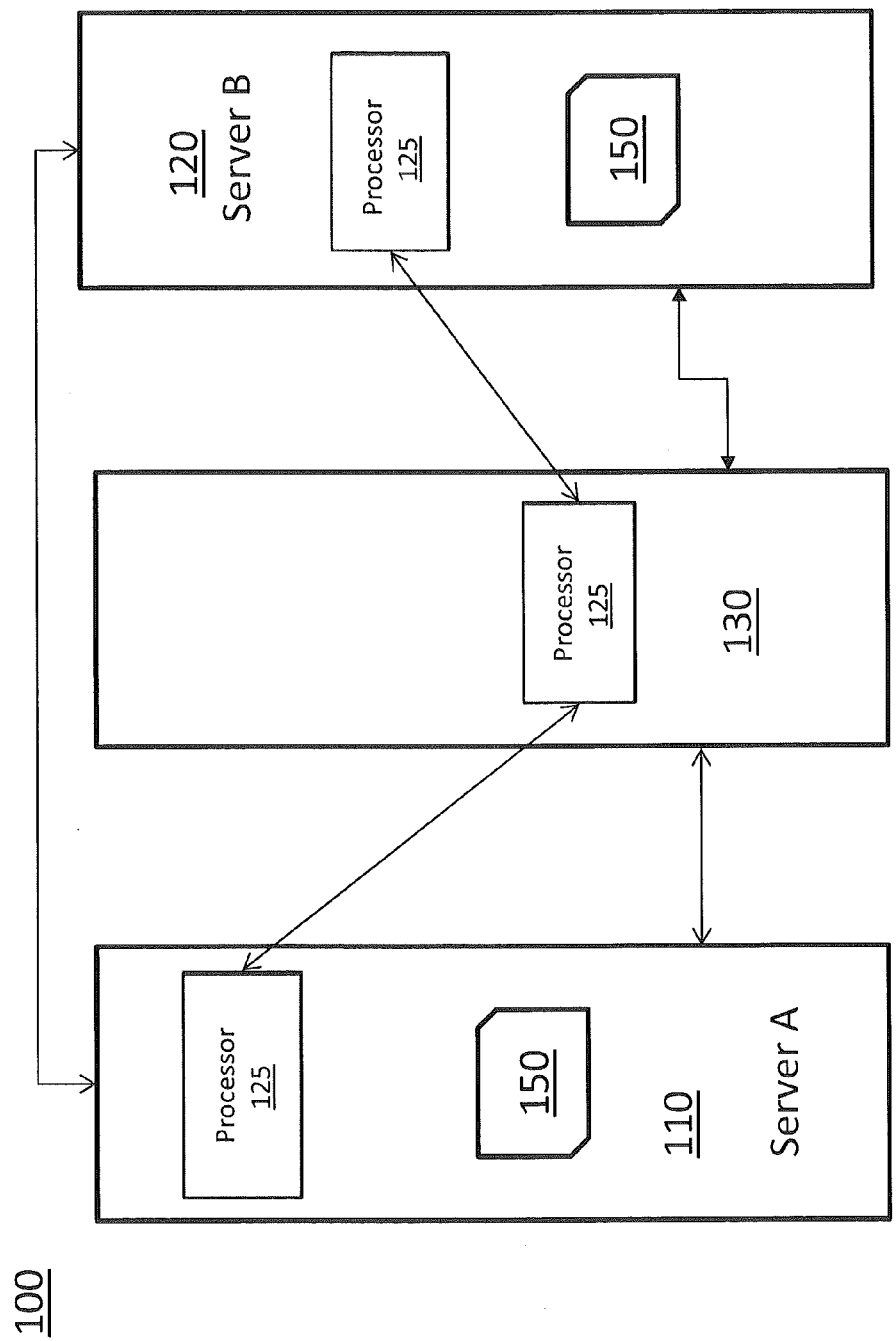
FIG. 1 depicts a block diagram of a system of servers in communication with one another in accordance with an embodiment.

FIG. 1 provides a block diagram of a system 100 having a plurality of servers 110, 120, and 130. For ease of reference, server 110 is denoted as server A and server 120 is denoted as server B. Each of servers A and B holds a set of data items 150 (also referred to as a data set), such as records stored in a corresponding relational database. The servers 110, 120, and 130 each includes a processor denoted as 125. One of the goals of the two servers A and B during operation of data manipulation is to compute the intersection of their two sets of data 150. This intersection operation can be used for computing the exact number of distinct elements in the union of their data sets, such as provided by the Jaccard similarity and the rarity as known to those skilled in the art.

As will be discussed in more detail, in one embodiment, to provide clarity of understanding, both data sets in servers A and B are considered to be limited to a size of at most k (for an input parameter k) and are drawn from some universe of n possible items. In this example as per one embodiment, a methodology will be discussed that uses $O(k)$ bits of communication to solve the intersection problem in $O(\log^* k)$ rounds of communication. A more trivial solution would require $O(k \log n)$ bits of communication; namely, server A can specify its data set to server B one item at a time. This method achieves an order of magnitude improvement by removing the log n factor. Moreover, the number of messages that need to be exchanged is only $O(\log^* k)$, which is the number of sequential evaluations of the logarithm function applied to k before the value is less than 1. In this example, $O(\log^* k)$ is much less than $O(\log k)$, much less than O(log log k) etc., and will be a very small constant. This provides for a smooth communication versus round (number of messages) tradeoff, showing that with r messages exchanged, the total communication is only O(k ilog ^r k), where ilog ^r is the r-th iterated logarithm function, so ilog ^1 k=log k, ilog ^2 k=log log k, ilog ^3 k=log log log k.

Current methods may potentially achieve an optimal O (k) bits of communication after requiring a number of rounds (messages exchanged) which also needed to be at least log k. This solution can greatly impact both speed and data integrity. In addition, since the number of rounds and total messages exchanged are known to be significant bottlenecks in cloud computing services, it is important to minimize these rounds and messages as much as possible. The solutions provided in one embodiment as will be discussed, provide better communication (messages exchange tradeoffs) and will in fact keep the tradeoff optimal.

Figure 2:
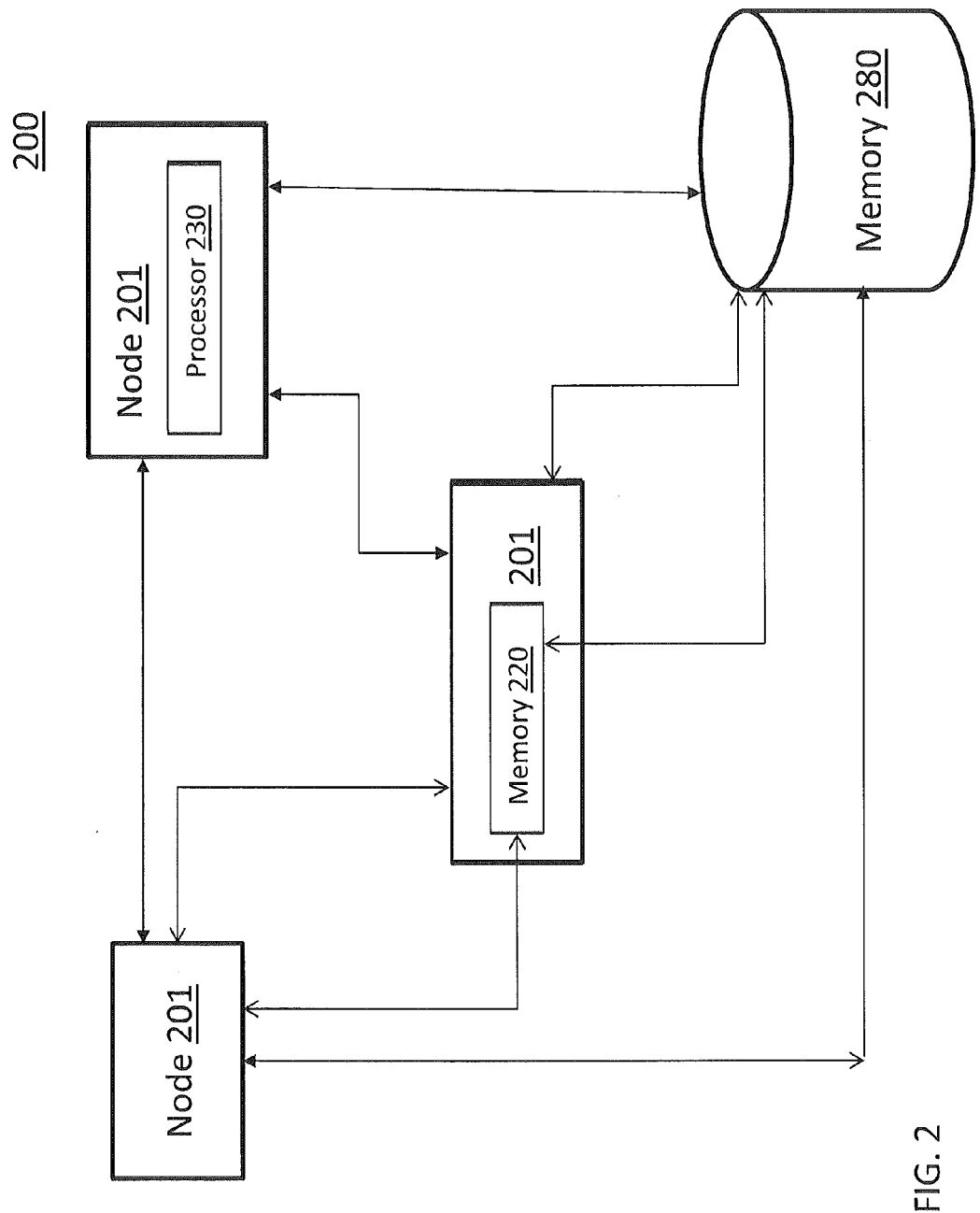
FIG. 2 depicts a block diagram of a computing environment that can be used in conjunction with the servers of FIG. 1.

FIG. 2 is a block diagram illustrating a computing environment for implementing the processes described herein. As illustrated in FIG. 2, a system 200 comprises a plurality of nodes 201 that are in processing communication with one another. This communication can be enabled through wired or wireless processing or other alternate means as can be appreciated by those skilled in the art. Each node 201 can also include one or more processors 230. Each node 201 can include its own internal memory as shown at 220, or may be in processing communication with that node's internal memories, or in communication with one or more external memories such as the one shown in FIG. 2 at 280. The system memories 220 and 280 can also be in communication directly with one another or through the node and either be comprised of a single unit that is shared among the many nodes 201 or may be comprised of a plurality of components that are in processing communication with one another. In this manner, each node 201 can either exclusively use a single memory or alternatively use multiple memories at the same time or at different times to achieve processing optimization.

In one embodiment, one or more nodes 201 or processors 230 can be used while in processing communication with one another one of the memories such as 220 or 280 to provide instructions for carrying out the techniques discussed above. The memories 220 and 280 can have a set of instructions recorded thereon which can be carried out by a corresponding processor to perform the processes described herein.

Referring back to FIG. 1, the servers in FIG. 1 are considered to be part of the nodes 201 as provided in FIG. 2. A fundamental communication problem in relational databases that are manipulated using a plurality of servers is the data distribution among the servers, especially when the servers need to compute the intersection of their data sets (e.g., the common records in a relational database). As discussed, this needs to be done with as little communication and as few messages (rounds) as possible. One possible solution is to use randomization. Given a protocol for computing the intersection, however, the latter can be used to compute the exact Jaccard similarity, the rarity, the number of distinct elements, and joins between databases. Computing the intersection is at least as hard as the set disjointness problem, which asks whether the intersection is empty.

Formally, in the two-server setting, the players (e.g., in the embodiment shown by servers A and B) hold subsets S,T ⊆[n]. In many realistic scenarios, the sizes of S and T are significantly smaller than n, so a constraint is imposed that $|S|,|T|\leq k$. To reach a solution, at least a minimum number of bits that the parties need to communicate in order to compute the intersection set S∩T, (given a certain number r of messages that are allowed to be exchanged) must be calculated. While O(k log(n/k)) bits is achieved trivially and deterministically with a single message, it must be determined whether randomization is possible with more than one message.

In one embodiment, as previously discussed, it is determined that a smooth communication/round tradeoff is possible with O(log*k) rounds. In other words, O(k) bits of communication is possible, which in turn improves upon the trivial protocol by an order of magnitude. This is in contrast to other basic problems such as computing the union or symmetric difference, for which Ω(k log(n/k)) bits of communication is required for any number of rounds. In addition, a first communication (versus round lower bounds for the set intersection problem) can be achieved which provides protocols that are optimal up to constant factors for any number of rounds.

In order to better understand the concepts above, a more detailed discussion may be helpful. Traditional communication complexities quantify the communication necessary for two or more players to compute a function, where each player holds only a portion of the function's input. This model is widely studied, with applications in circuit complexity, combinatorial auctions, compressed sensing, data streams, and many other areas.

In such as model, there is a function $f:D\times D\rightarrow R$, where D stands for domain and R for range. Referring back to FIG. 1, servers A and B denoted by 110 and 120, are given respective inputs x,y ∈D, and need to jointly compute $f(x,y)$. They take turns exchanging bits to each other according to a protocol, and then the players write the output of the protocol on their output tape. For deterministic protocols, this output must equal $f(x,y)$ for every input pair x,y. Let $D(f)$ be the minimum, over deterministic protocols, of the maximum number of bits exchanged by the protocol over all inputs.

For randomized protocols, there are two well-studied and closely-related models. In the common random string model, the players share an infinite string of independent unbiased coin tosses, and the players are otherwise deterministic. The correctness requirement is that for every input pair x,y, the output of servers A and B is equal to $f(x,y)$ with probability at least 1−δ, for some specified δ>0, where the probability is taken over the shared random string. Let $R_\delta(f)$ be the minimum, over protocols in the common random string model satisfying the correctness protocol for $f$, of the maximum number of bits exchanged by the protocol over all inputs and shared random strings. For brevity, let $R(f)=R_{1/3}(f)$. It should be noted that a ⅔ success probability can be amplified to 1−ε for an arbitrarily small constant ε>0 by incurring a constant factor overhead in communication.

In the private random string model, the players do not share a random string, but rather are allowed to be randomized using private randomness. It may be possible that any problem that can be solved in the common random string model can be solved in the private random string model, adding only O(log log T) to the communication complexity, where T is the number of different inputs to the players. One disadvantage of this reduction is that it is non-constructive in the sense that for each input length n, the protocol used is either hardwired to an advice string that depends on n, or the players must search for the advice string, which doesn't require communication, but can result in unnecessary computation. In one embodiment, upper bounds are provided in the common random string model, but need to define how to translate them into constructive protocols in the private random string model, while preserving optimality.

Besides the total amount of communication, another well-studied resource is the total number of messages exchanged between the two players, known as the round complexity. In certain applications a server may not always be online, resulting in a significant delay between messages. There may also be undesirable overhead in the transmission of each message. Thus, it is important to not only achieve optimal communication, but also an optimal number of rounds for a given amount of communication. $D^{(r)}(f)$ and $R^{(r)}(f)$ are used to denote the deterministic and randomized communication complexity (in the common random string model) for protocols restricted to using at most r rounds.

One known problem in communication complexity is the disjointness function $DISJ^n_k(S,T)$. In this problem, e.g., server A has an input set $S \subseteq [n]$ of size at most k, server B has an input set $T \subseteq [n]$ of size at most k, and $DISJ^n_k(S,T)=1$ iff $|S \cap T|=0$. It is often considered that $R(DISJ^n_k)=\Theta(k)$ so the lower bound of $\Omega(k)$ follows by taking known lower bounds for set disjointness without a cardinality restriction on S and T, and combining them with a padding argument.

In one embodiment, however, the solution provided attempts a much harder problem than the disjointness function. Namely, the entire set intersection $S \cap T$ is recovered rather than only deciding if $|S \cap T|=0$. This problem is hereinafter referenced as the $INT^k$ problem. Computing the intersection or the size of the intersection of two sets is a fundamental problem in computer science, with applications to distributed databases, including computing joins, finding duplicates, measuring Jaccard similarity, and computing rarity.

By the lower bound for the disjointness function, the $R(INT^k)=\Omega(k)$ which holds for any number of rounds. Also, servers A and B can deterministically exchange their inputs using only $O(k \log(n/k))$ bits of communication, so $D^{(1)}(INT^k)=O(k \log(n/k))$. They can also first hash the elements in their sets to $O(\log k)$-bit strings, and exchange the hashed values, from which they can decide which elements are in the intersection with probability $1-1/k^C$, for an arbitrarily large constant $C>0$. This means that $R^{(1)}(INT^k)=O(k \log k)$, which is optimal since $R^{(1)}DISJ_k^n=(k \log k)$.

A somewhat related problem is that of computing k copies of the equality function $EQ_k^n$. In this problem, server A has k strings:

$x^1, \ldots, x^k \in \{0,1\}^n$, server B also has k strings:
$y^1, \ldots, y^k \in \{0,1\}^n$, and $f(x^1, \ldots, x^k, y^1, \ldots, y^k)$, and $EQ_k^n (x^1, \ldots, x^k, y^1, \ldots, y^k)$ and is a length-k bit vector, where the i-th bit is 1 iff $x^i=y^i$.

One disadvantage of known protocols is that the number of rounds they achieve is $\Omega(k)$, which normally are inherently sequential. However, in one embodiment, by hashing into buckets, given a protocol for $EQ_k^n$, it is possible to build a protocol for the $INT^k$ problem. In fact, a randomized protocol for square root of $INT^{kc}$ with the optimal $O(k)$ bits of communication can be achieved. However, the round complexity is $O(k)$. Another way of obtaining the optimal $O(k)$ bits of communication is to use a technique to compress a protocol to its so-called internal information cost. For the $INT^k$ problem, the internal information cost is $O(k)$, and so this results in a protocol with the optimal $O(k)$ bits of communication, with a much smaller $O(\log k)$ number of rounds.

In one embodiment, a new randomized protocol for $INT^k$ is provided which achieves the optimal $O(k)$ bits of communication, and simultaneously achieves $O(\log^* k)$ number of rounds, where $\log^* k$ is the iterated logarithm function, that is the number of times the logarithm function must be iteratively applied before the result is at most 1. This number of rounds provides a significant improvement on the earlier $O(\log k)$ rounds needed to achieve the optimal $O(k)$ bits of communication provided in the existing techniques.

A more refined tradeoff is also achieved, showing that with $O(r)$ rounds, one can achieve communication $O(k \operatorname{ilog}^r k)$, where $\operatorname{ilog}^r k$ is the function obtained by iteratively applying the logarithm function r times (e.g., $\operatorname{ilog}^1 k = \log k$, $\log^2 k = \log \log k$, etc.). This protocol works in the common random string model, but can be turned into constructive protocols (i.e., without using Newman's theorem) in the private random string model, incurring an additive $O(\log \log n)$ bits of communication with no increase in the number of rounds. This also provides that upper bounds are optimal up to constant factors, by proving the first lower bounds for the $INT^k$ problem with r rounds. Namely, for any $r \geq 1$, it can be shown that $R^{(r)}(INT^k)=\Omega(k \log^r k)$, which matches upper bound up to a constant factor in the communication and the number of rounds. In addition, there is a simple $\Omega(\log \log n)$ lower bound in the private random string model, for any number of rounds, which follows by a reduction of $INT^1$ with sets drawn from the universe of size n to the $EQ_1^{\log n}$ problem. Hence, this protocol in the private random string model is also optimal. Since $EQ_k^n$ is also a special case of $INT^k$, it also significantly improves the round complexity which further provides for the tradeoff for $EQ_k^n$ to be optimal.

Set-intersection and list-intersection are common to database operations, and occur e.g., in data mining applications, text analytics, and evaluation of conjunctive queries. They are also key operations in enterprise and web search. Given the emergence of cloud computing and distributed databases, the communication cost becomes very important. A basic function, such as computing the join of two databases held by different servers, requires computing an intersection, which needs as little communication and as few messages as possible.

Current techniques do not provide for computing the size $|S \cap T|$ of the intersection with $O(k)$ communication and fewer than $O(\log k)$ rounds. In one embodiment, an upper bound for set intersection is provided which significantly improves the communication/round tradeoffs for computing $|S \cap T|$. Since communicating $|S|$ and $|T|$ can be done in one round, this gives the first protocol for computing the size $|S \cup T|$ of the union with the communication/round tradeoff. This in turn gives the first protocol for computing the exact Jaccard similarity $$\frac{|S \cap T|}{|S \cup T|},$$

exact Hamming distance, exact number of distinct elements, and exact 1-rarity and 2-rarity. To achieve these upper bounds, hashing and verification is used.

In order to use hashing and verification, first the following toy protocol can be used for understanding. Let there be a hash function $h:[n] \to [k/\log k]$ that the two players (servers) can share. For each $i \in [k/\log k]$, the players run a set intersection protocol on $S_i=\{x \in S | h(x)=i\}$ and $T_i=\{y \in T | h(y)=i\}$. To do so, note that with high probability, simultaneously for all $i \in [k/\log k]$, $|S_i|=O(\log k)$ and $|T_i|=O(\log k)$. Servers A and B now agree on a hash function $g_i:[n] \to [\log^3 k]$. If A sends $g_i(x)$ to B for each $x \in S_i$, then B can compute $g_i(y)$ for each $y \in T_i$ and check if $g_i(y)$ is in the list of hashed elements that A sent. B can similarly send the $g_i(y)$ values to A. Both parties therefore obtain candidate sets $I_A$ and $I_B$, respectively, for the intersection $S_i \cap T_i$. The communication for a given $i \in [k/\log k]$ is $O(\log k \log \log k)$ and the correctness probability is $$1 - \frac{1}{\Omega(\log k)}.$$

An important observation now is that $I_A$ and $I_B$ contain $S_i \cap T_i$ with probability 1. Therefore, if $I_A = I_B$, then in fact $I_A = I_B = S_i \cap T_i$. By spending an additional $O(\log k)$ bits of communication, servers A and B can run an equality test on $I_A$ and $I_B$, which may be considered a "verification test," and which succeeds with probability $1 - /kc$ for an arbitrarily large constant $C > 0$. Whenever the equality test succeeds, A and B can conclude $I_A = I_B = S_i \cap T_i$, since all such equality tests simultaneously succeed with very high probability. For the values of $i \in [k/\log k]$ for which the corresponding equality test detects that $I_A \neq I_B$, then the players re-run the set intersection protocol on $S_i$ and $T_i$. The expected number of re-runs for each $i \in [k/\log k]$ is less than 1, and so the overall expected communication is at most $2k/\log k \cdot O(\log k \log \log k) = O(k \log \log k)$, which can be made worst-case by terminating the protocol if it consumes more than a constant factor times its expected communication cost.

To improve the communication further, in one embodiment it is possible instead to hash into k buckets using a hash function h, and build a "verification tree" with these k buckets as the leaves. The tree has r levels, where r is the number of rounds. For $2 \leq i \leq r$, the nodes at distance i from the leaves have $i\log^{r-i} k / i\log^{r-i+1} k$ children, while the nodes at distance 1 (the parents of the leaves) have $i\log^{r-1} k$ children. For a given $i \in [k]$, define $S_i$ and $T_i$ as before. For each $i \in [k]$, a set intersection protocol on $S_i$ and $T_i$, can now be run with only constant expected communication. For a node at distance 1 from the leaves, a candidate set intersection can be provided for each of its $i\log^{r-1} k$ children. These $i\log^{r-1} k$ candidate intersections are concatenated as strings, and verify they are equal with a single equality test. If the equality test succeeds, then the process proceeds to the next level in the tree. At a node v in a given level of the tree, a single equality test can be performed on all candidate intersections of leaves in the subtree $T(v)$ rooted at v. If the equality test fails at v, the set intersection protocol can be re-run at all leaves in $T(v)$. By carefully choosing the correctness probability of the equality tests run at different levels in the tree, it can be inductively shown that the expected communication until the root succeeds is $O(k)$, and the number of rounds is $O(r)$.

Lower bound calculations will now be described. To provide lower bounds, the first observation is that $INT^k$ is at least as hard as $EQ_k^{n/k}$. This information is then used with a complexity paradigm. The idea is to consider the mutual information $I(\Pi;X,Y) = H(\Pi) H(\Pi|X,Y)$, where X, Y are the inputs to the two players in a communication problem $f$ drawn from a distribution $\mu$, $\Pi$ is the transcript of the randomized protocol used, and H is the entropy function. Since $I(\Pi;X,Y) \leq H(\Pi) \leq |\Pi|$, the mutual information lower bounds the communication of $\Pi$. Setting $IC_\mu^{(r)}(f) = \min_{correct\ \Pi} I(\Pi; X,Y)$, where correct $\Pi$ means a randomized r-round protocol $\Pi$ which errs in computing $f(X,Y)$ with probability at most $\frac{1}{3}$ on every input $(X,Y)$, one has $IC_\mu^{(r)}(f) \leq R^{(r)}(f)$. Letting $f^s$ be the function in which one player has inputs and the other has inputs $Y_1, \ldots, Y_s$, and the output is the s-tuple $(f(X_1, Y_1), f(X_2, Y_2), \ldots, f(X_s, Y_s))$, a direct sum theorem shows $IC_\mu^{(r)}(f^s) \geq s \cdot IC_\mu^{(r)}(f)$, where $(X_1, Y_1), \ldots, (X_s, Y_s) \sim \mu^s$. Hence:

$$R_{(r)}(INT^k) \geq R^{(r)}(EQ_k^{n/k}) \geq IC_\mu^{k(r)}(EQ_k^{n/k}) \geq k \cdot IC_\mu^{(r)}(EQ^{n/k}).$$

It can now be shown that $IC_\mu^{(r)}(EQ^{n/k}) = \Omega(i\log^r k)$ for $X, Y \sim \mu$.

It is known that t for $\mu$ the product uniform distribution on:

$$X, Y, IC_\mu^{(r)}(EQ^{n/k}) = \Omega((1-\delta)^3 i \log^r((1-\delta)/\epsilon)),$$

Where $\epsilon$ is the probability that the protocol declares that $X = Y$ when in fact $X \neq Y$, and $\delta$ is the probability that the protocol declares that $X \neq Y$ when in fact $X = Y$. Here the probability is over X and Y drawn from $\mu$, as well as the randomness of the protocol. If $\epsilon$ and $\delta$ are fixed constants bounded away from 0 and 1, then $IC_\mu^{(r)}(EQ^{n/k}) = \Omega(1)$ is obtained, which is too weak.

Instead, a distribution $\mu^0$ needs to be used that is different than $\mu$ above (as well as the notion of conditional information complexity). In the latter distribution, $\mu^0$ is such that $Pr_{\mu^0}[X \neq Y] \geq \frac{1}{3}$ and $Pr_\mu[X = Y] \geq \frac{1}{3}$. There is also an auxiliary random variable $W \sim v$, so that conditioned on $W = w$ for any value w, X and Y are independent. It is known that $IC_{(\mu')^k}^{(r)}(f^s) \geq s \cdot IC_{\mu',1/20,1/10,1/s}^{(r)}(f)$, where $IC_{\mu',1/20,1/10,1/s}^{(r)}(f)$ is the minimum value of $I(\Pi;X,Y|W)$ over r-round randomized protocols $\Pi$ which, with probability at least $19/20$ over their randomness, result in a deterministic protocol which is allowed to output "abort" with probability at most $1/10$, and given that it does not abort, it is correct with probability at least $1 - 1/s$. Here, the latter two probabilities are over input pairs $(X,Y) \sim \mu^0$. One idea is to change such a protocol for the $EQ^{n/k}$ problem: whenever it would output "abort", have it instead declare that $X \neq Y$. Then, conditioned on the private randomness resulting in a deterministic protocol with the property as described, hereinafter referenced as event E, this modification makes the resulting deterministic protocol have the property that if $X \neq Y$, then the protocol outputs $X = Y$ with probability at most $(1/s)/Pr_{\mu^0}[X \neq Y] \leq 3/s$. However, if $X = Y$, then the protocol may output $X \neq Y$ with probability $1/10 + (1/s)/Pr_{\mu^0}[X = Y] \leq 1/10 + 3/s \leq 1/5$, where the latter follows for $s \geq 30$. To aid understanding, this is now referenced as the new protocol $\Pi^0$. Then, conditioned on E, $\Pi^0$ rarely (probability $O(1/s)$) makes a mistake when $X \neq Y$, while with constant probability it makes a mistake when $X = Y$. Using this, it can be shown that:

$$I(\Pi;X,Y|W) = \Omega(I(\Pi;X,Y|W,\epsilon)) - 1 = \Omega(I(\Pi';X,Y|W,\epsilon)) - 2 = \Omega(IC_\mu^{(r)}(EQ^{n/k})) - 2 = \Omega(i\log^r k)$$

where the non-trivial step is showing that for $X, Y \sim \mu^0$ and $W \sim v$, that: $I(\Pi'; X,Y|W,\epsilon) = \Omega(IC_\mu^{(r)}(EQ^{n/k}))$, which can be proven directly using the definition of $\mu$ and $v^0$ and their relationship with $\mu$.

Let $EQ^n$ denote the communication problem of solving Equality on binary strings of length n. Let $EQ_k^n$ denote the communication problem, corresponding to k independent instances of $EQ^n$. Let $INT^k$ denote the communication problem of computing the intersection of two sets $S, T \subseteq [n]$, such that $|S|, |T| \leq k$. A simple reduction from $EQ_k^n$ to $INT^k$ can be given as follows. For an instance $(x^1, \ldots, x^k, y^1, \ldots, y^k)$ of $EQ_k^n$ an instance of $INT^k$ is constructed by creating two sets of pairs $(1, x^1), \ldots (k, x^k)$ and $(1, y_1), \ldots (k, y^k)$. The size of the intersection between these two sets is exactly equal to the number of equal $(x^i, y^i)$ pairs.

It is known that (Fact 2.1): if there exists a protocol Π for $INT^k$, where the sets are drawn from a universe of size $N \geq k^c$ for $c > 2$ then there exists a protocol $\Pi^0$ for $EQ^n_k$ with the same communication complexity and success probability for $n = b \log(\frac{N}{k})c$.

It is also known that (Fact 2.2): for any set $S \subseteq [n]$ of size $|S| \geq 2$ and $i \geq 0$ a random hash function $h:[n] \to [t]$, where $t = O(|S|^{i+2})$ has no collisions with probability at least $1 - 1/|S|^i$, namely for all $x, y \in S$ such that $x \neq y$ it holds that $h(x) \neq h(y)$. Moreover, a random hash function satisfying such guarantee can be constructed using only $O(\log n)$ random bits.

Basic concepts about collision probability of a random hash function can now be used. To aid understanding a summary of basic properties of the entropy of a discrete random variable X, denoted as $H(X)$, and the mutual information between two discrete random variables X and Y, denoted as $I(X;Y) = H(X) H(X|Y)$, can be provided below.

Entropy Propositions (referenced as 2.3):
1. Entropy span: $0 \leq H(X) \leq \log|\text{supp}(X)|$.
2. $I(X;Y) \geq 0$ because $H(X|Y) \leq H(X)$.
3. Chain rule:
$I(X_1, X_2, \ldots, X_n; Y|Z) = \Sigma_{i=1}^n I(X_i; Y|X_1, \ldots, X_{i-1}, Z)$.
4. Subadditivity: $H(X,Y|Z) \leq H(X|Z) + H(Y|Z)$, where the equality holds if and only if X and Y are independent conditioned on Z.
5. Fano's inequality: Let A be a random variable, which can be used as "predictor" of X, namely there exists a function g such that $\Pr[g(A) = X] \geq 1 - \delta$ for some $\delta < \frac{1}{2}$. If $|\text{supp}(X)| \geq 2$ then $H(X|A) \leq \delta \log(|\text{supp}(X)| - 1) + h_2(\delta)$, where $h_2(\delta) = \delta \log(1/\delta) + (1-\delta) \log$ $$\frac{1}{1-\delta}$$

is the binary entropy.

The standard definitions from information complexity for protocols with abortion, can be denoted as $IC_{\mu,\alpha,\beta,\delta}(f|v)$. Given a communication problem $f: X \times Y \to Z$, consider the augmented space $X \times Y \times D$ for some D. Let λ be a distribution over $X \times Y \times D$, which induces marginals μ on $X \times Y$ and ν on D. This means that ν partitions μ, if μ is a mixture of product distributions, namely for a random variable $(X,Y,D) \sim \lambda$, conditioning on any value of D makes the distribution of $(X,Y)$ product. To simplify the notation, a δ-protocol for $f$ is one that for all inputs $(x,y) \in X \times Y$ computes $f(x,y)$ with probability at least $1-\delta$ (over the randomness of the protocol). The following definition is also known and can be used.

Protocols with abortion will now be described. Consider a communication problem given by $f: X \times Y \to Z$ and a probability distribution μ over $X \times Y$. This means that a deterministic protocol $\Pi_D(\beta,\delta)$-computes f with respect to μ if it satisfies the following (where $(X,Y) \sim \mu$):
1. (Abortion probability) $\Pr[\Pi_D(X,Y) = \text{'abort'}] \leq \beta$
2. (Success probability) $\Pr[\Pi_D(X,Y) \neq f(X,Y) | \Pi_D(X,Y) \neq \text{'abort'}] \leq \delta$.

Randomized protocols can be viewed as distributions over deterministic protocols (both for private-coin and public-coin protocols). In other words, a randomized protocol $\Pi(\alpha,\beta,\delta)$-computes f with respect to μ if $$\Pr_{\Pi_D \sim \Pi}[\Pi_D(\beta, \delta) - \text{computes } f] \geq 1 - \alpha.$$

The probability is taken over all randomness of the parties.

Information complexity for protocols with abortion will now be described. Let Π be a protocol, which computes f. The conditional information cost of Π under λ is defined as $I(\Pi(X,Y); X,Y|D)$, where $(X,Y,D) \sim \lambda$. The conditional information complexity of f with respect to λ, denoted by $IC_{\mu,\delta}(f|v)$, is defined as the minimum conditional information cost of a δ-protocol for f. The information complexity with aborts, denoted by $IC_{\mu,\alpha,\beta,\delta}(f|v)$, is the minimum conditional information cost of a protocol that $(\alpha,\beta,\delta)$-computes f. The analogous quantities $IC_{\mu,\delta}^{(r)}(f|v)$ and $IC_{\mu,\beta,\delta}^{(r)}(f|v)$ are defined by taking the respective minimums over only r-round protocols.

Upper bound calculations will now be described. To compute upper bounds, a simple protocol can be provided with a linear communication:

Theorem 3.1. There exists an $O(k)$-round constructive randomized protocol for $INT^k$ with success probability $1 - 1/\text{poly}(k)$. In the model of shared randomness the total expected communication is $O(k)$ and in the model of private randomness it is $O(k + \log \log n)$.

Let $m = k^c$ for a constant $c > 2$. First, the parties pick a random hash function $H:[n] \to [m]$, which gives no collisions on the elements in $S \cup T$ with probability at least $1 - 1/\Omega(k^{c-2})$. Thus, for the rest of the analysis it can be assumed that $S, T \subseteq [m]$. A random hash function $h:[m] \to [k]$ can now be picked. For a set $U \subseteq [m]$, use notation $U_i = h^{-1}(i) \cap U$ for the preimage of i in U. Using preimages $S_i$ and $T_i$ the parties construct a collection of instances of Equality, which contains an instance of Equality(s,t) for every $(s,t) \in S_i \times T_i$ for every $i \in [k]$.

Formally, for two sets of instances of a communication problem C, say $C_1 = C(x_1, y_1), \ldots, C(x_i, y_i)$ and $C_2 = C(x'_1, y'_1) \ldots, C(x'_j, y'_j)$ their concatenation is denoted, which corresponds to solving $C_1$ and $C_2$ simultaneously as $C_1 \cup C_2 = (x_1, y_1), \ldots, (x_i, y_i), (x'_1, y'_1), \ldots (x'_j, y'_j)$. It is denoted that $E_i = F_{(s,t) \in (s^i \times T^i)} EQ(s,t)$, the collection of instances of equality corresponding to hash value i. The collection of all instances constructed by the parties is $E = \cup_{r=1}^k E_i$.

The expected number of instances $\mathbb{E}[|E|]$ is given as:

$$\mathbb{E}[|E|] = \mathbb{E}\left[\sum_{i=1}^k |S_i||T_i|\right] \quad (1)$$

$$= \sum_{i=1}^k \mathbb{E}[|S_i||T_i|]$$

$$\leq \sum_{i=1}^k \mathbb{E}[|(S \cup T)_i|^2]$$

$$= \sum_{i=1}^k \text{Var}[|(S \cup T)_i|] + \mathbb{E}[|(S \cup T)_i|]^2$$

Given that for a set Z, the random variable $|Z|_i$ is distributed according to a binomial distribution $B(|Z_i|, 1/k)$, for each i, $\text{Var}[|S \cup T|_i] \leq 2k \cdot (1/k)(1-1/k) \leq 2$ and $\mathbb{E}[|S \cup T|_i] \leq 2$ so $\mathbb{E}[|E|] \leq 6k$. The following can now be used:

Theorem 3.2. There exists an $O(k)$-round constructive randomized protocol for $EQ^n_k$ with success probability $2^{-\Omega(k)}$. In the public randomness model the expected total communication is $O(k)$ and in the private randomness model it is $O(k + \log n)$.

In the shared randomness model the result now follows immediately. In the private randomness model, the parties need to construct two random hash functions H and h, using Fact 2.2 with only $O(\log n)+O(\log k)=O(\log n)$ random bits. These bits are exchanged through the channel in the first round of the protocol and are added to the total communication, bringing it down to $O(k+\log n)$. To further reduce the communication, a hashing scheme can be used as the first step of the protocol. In it is shown that mapping elements $[n]$ by taking a remainder modulo a random prime $q=O\sim(k^2 \log n)$ gives no collisions on a subset of size $O(k)$ with probability $1-1/\text{poly}(k)$. Applying this result to $S\cup T$, the length of strings can be reduced in the instances of equality down to $O(\log k+\log \log n)$. Thus, the pairwise independent hash function using only $O(\log k+\log \log n)$ random bits can now be specified.

Auxiliary protocols can also be used. In one example a Basic-Set-Intersection (Lemma 3.3) and Equality (Fact 3.5) can be used as building blocks in the main algorithm. For a two-party communication protocol $\Pi$, it should be denoted that the output of the protocol for the first party as $\Pi_A(x,y)$ and for the second party as $\Pi_B(x,y)$.

Lemma 3.3 (Protocol Basic-Set-Intersection(S,T)). There exists a randomized protocol $\Pi$ (with shared randomness), such that for any $S,T \subset [n]$ and an integer $i \geq 1$, the sets $S^0=\Pi_A(S,T)$ and $T^0=\Pi_B(S,T)$ satisfy the following properties:
1. $S^0 \subseteq S, T^0 \subseteq T$.
2. If $S \cap T = \emptyset$ then $S^0 \cap T^0 = \emptyset$ with probability 1.
3. If $S \cap T \neq \emptyset$ then $(S \cap T) \subseteq (S^0 \cap T^0)$ and with probability $1-1/m^i$ it holds that $S^0=T^0=(S \cap T)$.

The total communication in the protocol is $O(i \cdot (|S|+|T|) \log(|S|+|T|))$.

In this scenario, the servers (players) first exchange the sizes of their sets $|S|$ and $|T|$ and determine $m=|S|+|T|$. Then they pick a random hash function $h:[n] \to [t]$, where $t=O(m^{i+2})$. They exchange sets $h(S)$ and $h(T)$ using total communication $O(i \cdot m \log m)$. The outcome of the protocol is $\Pi_A(S,T)=h^{-1}(T) \cap S$ and $\Pi_B(S,T)=h^{-1}(S) \cap T$. By construction, now it is provided that $S^0=h^{-1}(T) \cap S \subseteq S$ and similarly $T^0 \subseteq T$ so the first property holds. If $S \cap T = \emptyset$ then $S^0 \cap T^0 = (h^{-1}(T) \cap S) \cap (h^{-1}(S) \cap T) \subseteq (S \cap T) = \emptyset$ and the second property holds. Because $S \subseteq h^{-1}(S)$ and $T \subseteq h^{-1}(T)$, then $S \cap T \subseteq (h^{-1}(T) \cap S) \cap (h^{-1}(S) \cap T) = S^0 \cap T^0$, the first part of the third property. Moreover, if the hash function h has no collisions then $S^0 = h^{-1}(T) \cap S = T \cap S$ and $T^0 = h^{-1}(S) \cap T = S \cap T$. The proof is completed using the analysis of collision probability given by Fact 2.2. In this manner the following corollary is also provided:

Corollary 3.4. f for the protocol $\Pi$ for Basic-Set-Intersection in Lemma 3.3, it holds that $\Pi_A(S,T)=\Pi_B(S,T)$ then $\Pi_A(S,T)=\Pi_B(S,T)=S \cap T$.

This can now be used as an $EQ^n$ test with the following guarantees to verify correctness of the protocol Basic-Set-Intersection. The following guarantee is achieved by a protocol, which uses a random hash function h into k bits:

Fact 3.5. There exists a randomized (with shared randomness) protocol $\Pi$ for $EQ^n$ with the following properties.
1. If $x=y$ then $\Pi A(x,y)=\Pi B(x,y)=1$ with probability 1.
2. If $x \neq y$ then $\Pi_A(x,y)=\Pi_B(x,y)=0$ with probability at least $1-1/2^k$.

The total communication in the protocol is $O(k)$ and it can be executed in one round.

A protocol with optimum round vs. communication trade-off will now be described. Achieving the optimum trade-off between the number of rounds in the protocol and the total communication is provided. Some definitions and notations are first introduced to better explain these concepts. The following definition of the iterated logarithm functions $\text{ilog}^i$ z and $\log^* z$. Let $\text{ilog}^0 z=z$ and for an integer $i \geq 1$ let $\text{ilog}^i z=\log \text{ilog}^{i-1} z)$ is used. Let $\log^* z=0$ if $z=0$ and $\log^* z=1+\log^*(\log z)$ for $z>0$:

Theorem 3.6. For every integer $r>0$ there exists an $O(r)$-round constructive randomized communication protocol (with shared randomness) for $INT^k$ with total expected communication $O(k \text{ ilog}^r k)$ and success probability $1-1/\text{poly}(k)$.

For $r=1$, the servers (parties) can use a hash function $H:[n] \to [m]$ for $m=k^c$ for $c>2$. Then each of the parties uses $O(k \log k)$ bits to exchange $H(S)$ and $H(T)$ respectively. For $r>1$ consider a tree T of depth r with the set of nodes at the i-th level for $0 \leq i \leq r$ denoted as $L_i$ (these are the nodes at distance i from the leaves). Let the degree at the i-th level for $2 \leq i \leq r$ be equal to $d_i=\text{ilog}^{r-i}k/\text{ilog}^{r-i+1}k$ and the degree at the first level is $d_1=\text{ilog}^{r-i}k$. Note that this guarantees that the total number of leaves in the tree is k. For a node $v \in T$, let $c(v)$ denote the set of children of v. For a node $v \in T$, let $C(v)$ denote the set of all leaves in the subtree of v. Note that for a node $v \in L_i$ the number of such leaves is $|C(v)|=\text{ilog}^{r-i}k$. Referring back to FIG. 1, servers 110 (A) 120 (B) can use shared randomness to pick a hash function $h:[n] \to [k]$. Initially the parties assign preimages $S_i=h^{-1}(i) \cap S$ and $T_i=h^{-1}(i) \cap T$ to the leaves in T. Since $S_v=\cup_{i \in C(v)} S_i$ and $T_v=\cup_{i \in C(v)} T_i$, then the protocol proceeds in r rounds. In the round $0 \leq i \leq r$ the parties process all nodes in $L_i$, assigning sets to the nodes in the tree. Notations $S_v^i$ and $T_v^i$ can be used respectively for the sets that each party assigns to a node $v \in L_i$ after round i of the protocol.

For a node $v \in L_i$, and its child $u \in c(v)$ let $S_u^{i-1}$ denote the set assigned by server A in the round $i-1$ of the algorithm to this child. Let $S_v^{i-1}=\cup_{u \in c(v)} S_u^{i-1}$ and $T_v^{i-1}$ defined analogously. First, the parties run the protocol Equality($S_v^{i-1}, T_v^{i-1}$) with success probability $1-\frac{1}{2^i}(\text{ilog}^{r-i-1}k)^3$. If the protocol returns $S_v^{u-1}=T_v^{i-1}$ then they do nothing. Such nodes are considered to be successful when other nodes failed. For every leaf $u \in C(v)$ of a failed node $v \in L_i$ the parties run Basic-Set-Intersection($S_u^{i-1}, T_u^{i-1}$) with success probability $1-\frac{1}{2^i}(\text{ilog}^{r-i-1}k)^3$ and assign $S_u^i=\Pi_A(S_u^{i-1},T_u^{i-1})$ and $T_u^i=\Pi_B(S_u^{i-1},T_u^{i-1})$ respectively:

Lemma 3.7. After round i for every leaf $u \in T$ it holds that $S_u^i=T_u^i$ with probability at least $1-\frac{1}{2^i}(\text{ilog}^{r-i-1}k)^3$, taken over all the randomness of the protocol.

In this example, if u is in the subtree of a node v, which is not failed at level i. Then $S_v=T_v$ and thus $S_u=T_u$ for each $u \in C(v)$ with probability at least $1-\frac{1}{2^i}(i \log^{r-i-1}k)^3$ by the guarantee of the Equality($S_v,T_v$) test. Otherwise, u is in the subtree of a failed node v at level i. In this case the claim follows that because Basic-Set-Intersection protocol can run for this leaf with success probability at least $1-\frac{1}{2}i(\text{ilog } r-i-1k)3$. Let a node $v \in L_i$ correct if after round i it holds that $S_v^i=T_v^i$.

Corollary 3.8. Every node $v \in L_i$ is correct with probability at least $1-1/(2^i(\text{ilog}^{r-i-1}k)^2)$. In particular, the root of the tree is correct with probability at least $1-1/(2^r k^2)$.

When Lemma 3.7 is applied to the level i it follows that after the execution of round i for every leaf $u \in C(v)$ it holds that $S_u^i=T_u^i$ with probability at least $1-\frac{1}{2^i}(\text{ilog}^{r-i-1}k)^3$. Hence, by a union bound over all $\text{ilog}^{r-i}k$ such leaves with probability at least $1-\text{ilog}^{r-i}k/2^i(\text{ilog}^{r-i-1}k)^3=1-1/(2^i(\text{ilog}^{r-i-1}k)^2)$, then $S_v^i=T_v^i$. The correctness proof of the protocol now follows from the following invariant applied to the the root of the tree in the end of the execution. Note that this invariant is maintained by Basic-Set-Intersection (Corollary 3.4). During the execution of the protocol the sets $S'_v$ and $T'_v$ only change when Basic-Set-Intersection is applied to the leaves in T. Clearly, if the invariant is maintained for all leaves then it is also maintained for all internal nodes as well:

Proposition 3.9. If for a node $v \in T$ A and B assign $S_v^i$ and $T_v^i$ to it respectively then if $S_v^i = T_v^i$ then $S_v^i = T_v^i = S_v \cap T_v$.

For a leaf $u \in T$ let $n_u$ denote the expected number of times the Basic-Set-Intersection protocol was run on the sets assigned to u.

Lemma 3.10. For every leaf $u \in T$ it holds that $E[n_u] = O(1)$.

For a leaf u let's denote the node v, such that $v \in L_i$ and u is in the subtree of v as $p_i(u)$. $E[n_u]$ can be expressed as:

$$E[n_u] = \sum_{i=0}^{r-1} Pr[p_i(u) \text{ is failed}] \cdot (i+3i \log^{r-i} k) \leq \sum_{i=0}^{r-1} d_i \cdot Pr[v \text{ is an incorrect child of } p_i(u)](i+3i \log^{r-i} k),$$

where the inequality holds by a union bound. The right-hand side can be bounded using Corollary 3.8 as:

$$\sum_{i=0}^{r-1} d_i \cdot Pr[v \text{ is an incorrect child of } p_i(u)](i + 3i\log^{r-i} k) \leq$$

$$\sum_{i=0}^{r-1} \frac{i\log^{r-i} k}{i\log^{r-i+1} k} \cdot \frac{1}{(2^{i-1}(i\log^{r-i} k)^2)} \cdot (i + 3i\log^{r-i} k) = O(1)$$

The total expected communication in the protocol can be expressed as the sum of the total communication for Equality and Basic-Set-Intersection. The total communication for Equality is:

$$\sum_{i=0}^{r-1} |L_i| O(i + 3i\log^r k) = O(ki\log^r k) + \sum_{i=1}^{r-1} (k/i\log^{r-i} k) \cdot O(i + 3i\log^{r-i} k),$$

where the second term is $o(k \text{ ilog}^r k)$. The expected total communication for Basic-Set-Intersection is by Lemma 3.3 equal to:

$$\mathbb{E}\left[\sum_{i=1}^{k} (|S_i| + |T_i|)\log(|S_i| + |T_i|) \cdot n_i\right] = \sum_{i=1}^{k} \mathbb{E}[(|S_i| + |T_i|)\log(|S_i| + |T_i|)]\mathbb{E}[n_i],$$

where the equality follows from the independence of the random variables.

Because for every i, $E[n_i] = O(1)$ by Lemma 3.10, to complete the proof it is sufficient to show that $E[(|S_i|+|T_i|) \log(|S_i|+|T_i|)] = O(1)$ and thus the total communication for Basic-Set-Intersection is $O(k)$. In addition, $E[(|S_i|+|T_i|) \log(|S_i|+|T_i|)] \leq [(|S_i|+|T_i|)^2]$, where the right-hand side is constant by the same argument as used to bound each term in (1).

Finally, the bound on the number of rounds of communication follows from the fact the communication in each of the r rounds of the protocol can be performed in a constant number of rounds of communication. This is because the communication for the Equality tests can be done in parallel and takes one round. After this one more round is required to perform all Basic-Set-Intersection protocols in parallel.

Now that the issues of calculating the upper bounds have been resolved, lower bounds can be calculated. It is known that:

Theorem 4.1. There exists a distribution on $X \times Y \times D$ with marginals $\mu$ on $X \times Y$ and $\nu$ on D, such that $\nu$ partitions $\mu$ and:

$$IC_{\mu,\delta}^r(EQ_k^{n/k}|\nu^k) = \Omega(k \text{ i log}^r k)$$

The strong direct sum theorem can now be used. The simulation procedure used is also used to preserves the number of rounds in the protocol, which allows us to state their theorem for bounded round protocols:

Theorem 4.2. Let $\delta \leq 1/3$. Then for every function $f: X \times Y \to Z$ and distribution $\lambda$ on $X \times Y \times D$ with marginal $\mu$ on $X \times Y$ and marginal $\nu$ on D, such that $\mu$ is partitioned by $\nu$, it holds that $IC_{\mu^k,\delta}^r(f^k|\nu^k) \geq \Omega(k) IC_{\mu,1/20,1/10,\delta/k}^r(f|\nu)$.

Using the direct sum above it remains to show the following:

Theorem 4.3. There exists a distribution on $X \times Y \times D$ with marginals $\mu$ on $X \times Y$ and $\nu$ on D, such that $\nu$ partitions $\mu$ and:

$$IC_{\mu,1/20,1/10,\delta/k}^r(EQ^{n/k}|\nu) = \Omega(i \log^r k)$$

Let $L = n/k$. The same hard distribution can now be used. To construct $\mu$ and $\nu$, let $D_0$ be a random variable uniformly distributed on $\{0,1\}$ and let D be a random variable uniformly distributed on $\{0,1\}^L$. Let $(X,Y)$ be a random variable supported on $\{0,1\}^L \times \{0,1\}^L$ such that, conditioned on $D_0 = 0$, X and Y are distributed independently and uniformly on $\{0,1\}^L$, and conditioned on $D_0 = 1$ so that $X = Y = D$. Let $\mu$ be the distribution of $(X,Y)$ and let $\nu$ be the distribution of $(D_0 D)$. Note that $\nu$ partitions $\mu$. Also, this distribution satisfies that $Pr[X=Y] \geq 1/3$ and $Pr[X \neq Y] \geq 1/3$. Let W be a random variable distributed according to $\nu$. Let E be an indicator variable over the private randomness of $\Pi$ which is equal to 1 if and only if conditioned on this private randomness $\Pi$ satisfies that it aborts with probability at most $1/10$ and succeeds with probability at least $1-\delta/k$ conditioned on nonabortion. Given such protocol with abortion $\Pi$, the function is transformed it into a protocol $\Pi^0$ which never aborts, has almost the same information complexity and gives correct output on non-equal instances with high probability, while being correct on equal instances with constant probability. This is done by constructing $\Pi^0$ so that whenever $\Pi$ outputs "abort," the output of $\Pi^0$ is $X \neq Y$, otherwise $\Pi = \Pi^0$. Under the distribution $\mu$ conditioned on the event $E=1$ the protocol $\Pi^0$ has the property that if $X \neq Y$, then it outputs $X = Y$ with probability at most $(1/k)/Pr_\mu[X \neq Y] \leq 3/k$. However, if $X = Y$, then the protocol may output $X \neq Y$ with probability $1/10 + (1/k)/Pr_\mu[X=Y] \leq 1/10 + 3/k \leq 1/5$, where the latter follows for $k \geq 30$. Thus, conditioned on $E=1$, the protocol $\Pi^0$ has failure probability $\epsilon = 1/k$ on non-equal instances $X \neq Y$, and constant failure probability $\delta = 1/5$ on equal instances $X = Y$, as desired. In this regime the following theorem can be used:

Theorem 4.4 (Information Complexity Lower Bound for Equality). Let $\delta$ be the error on equal instances and be the error on non-equal instances. Let $\tilde{n} = \min\{n + \log(1-\delta), \log((1-\delta)/\epsilon)\}$. For $\delta \leq 1-8(i\log^{r-2} \tilde{n})^{-1/8}$ and a uniform distributions over the inputs $\mu_u$ it holds that:

$$IC_{\mu_u,\epsilon,\delta}^r(EQ^n) = \Omega((1-\delta)^3 i \log^{r-1} \tilde{n})$$

$$IC_{\mu,1/20,1/10,\delta/k}^{(r)}(EQ^{n/k}|\nu) \geq I(\Pi;X,Y|W) = \Omega(I(\Pi;X,Y|W, E=1)) - 1 = \Omega(I(\Pi';X,Y|W,E=1)) - 2$$

Here the inequality is by definition of information complexity and the equalities follow from Proposition 2.3 together with the fact that $H(E) \leq 1$ (as $Pr[E=1] = 19/20$) and the fact that the transcripts of the protocols $\Pi$ and $\Pi^0$ only differ in a single bit. The right-hand side can be bounded using the following proposition.

Proposition 4.5. $I(\Pi';X,Y|W,E=1)) = \Omega(IC_{\mu_u,1/k,1/5}^{(r)}(EQ^{n/k}))$ This follows from the construction of the distributions $\mu$ and $\nu$. If $D_0 = 0$ then $X = Y$ and the information revealed by $\Pi$ is equal to zero. Otherwise, if $D_0=1$ then the distribution of $(X,Y)$ is uniform. Because the latter happens with probability ½, $I(\Pi';X,Y|W,E=1))\geq \frac{1}{2}\cdot IC_{\mu_u,1/k,1/5}(EQ^{n/k}))$ (as desired).

Thus: $IC_{\mu,1/20,1/10,\delta/k}^{(r)}(EQ^{n/k}|v)=\Omega(IC_{\mu_u,1/k,1/5}^{(r)}(EQ^{n/k}))$. The process of calculation is now completed by noting that setting $\epsilon=1/k$ and $\delta=\frac{1}{5}$ in Theorem 4.4 gives $IC_{\mu_u,1/k,1/5}^{(r)}(EQ^{n/k})=\Omega(i\log^r k)$.

FIG. 3 is a process flow illustrating one embodiment. In block 310, a plurality of data items in a relational data base are analyzed. Different portions of the data items are stored in a plurality of servers. In block 320, a maximum size of a subset of the data items stored in each of at least two of the servers is determined. In block 330, a logarithmic function is calculated at least based on the maximum size of the subset of the data items in each of the two servers. In block 340, a highest number of sequences of communications between the two servers are calculated such that when the logarithmic function is iteratively applied, the value of the logarithmic function still remains smaller than 1. In block 350, a protocol is generated between the two servers. The protocol calculates an intersection operation using the highest number of sequences calculated. The intersection operation determines common data items stored in the two servers by having the servers communicate with one another such that the number of times the communications are exchanged does not exceed the highest number of sequences calculated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method comprising:
analyzing a plurality of data items in a relational database, wherein different portions of the data items are stored in a plurality of servers;
determining a maximum size of a subset of the data items stored in each of at least two servers among the plurality of servers;
calculating a logarithm function based on the maximum size of the subset of the data items in each of the at least two servers;
calculating a highest number of sequences of communications between the at least two servers such that when the logarithmic function is iteratively calculated, a result of the logarithmic function remains smaller than 1; and
generating a protocol between the two at least servers for performing an intersection operation using the highest number of sequences calculated, wherein the intersection operation determines common data items stored in the at least two servers through communications between the at least two servers such that the number of times the communications are exchanged does not exceed the highest number of sequences calculated.

2. The method of claim 1, wherein the intersection operation is used to compute a number of distinct elements in a union of the data items between the at least two servers.

3. The method of claim 1, wherein the protocol is generated by Jaccard similarity.

4. The method of claim 1, wherein the highest number of sequences is defined as $O(k)$ bits where k is the maximum size of the subset of the data items in each of the at least two servers.

5. The method of claim 4, wherein the maximum size of the subset of the data items is defined as n and the logarithmic function is defined as $O(k \log n)$ bits of communication.

6. The method of claim 4, wherein the value of n is alterable when new data items are added and when existing data items are removed from the relational database such that $O(k \log n)$ is further calculated by the logarithmic function $O(\log^* k)$ for the at least two servers.

7. The method of claim 6, wherein the at least two servers deterministically exchange their inputs using only $O(k \log (n/k))$ bits of communication.

8. The method of claim 7, wherein the at least two servers hash their data items in elements of $O(\log k)$-bit strings.

9. The method of claim 8, wherein the at least two servers exchange the hashed values, in order to determine which elements are in the intersection of their data items.

10. The method of claim 9, wherein the logarithmic function includes an upper bound and a lower bound in its functional calculation.

11. The method of claim 10, wherein the intersection operation is generated by considering both the upper bound and the lower bound in the logarithmic function.

12. A computer program product comprising a computer readable storage medium having program code embodied therewith, the program code is executable by a processor to:
analyze a plurality of data items in a relational database, wherein different portions of the data items are stored in a plurality of servers;
determine a maximum size of a subset of the data items stored in each of at least two servers among the plurality of servers;
calculate a logarithm function based on the maximum size of the subset of the data items in each of the at least two servers;
calculate a highest number of sequences of communications between the at least two servers such that when the logarithmic function is iteratively calculated, a result of the logarithmic function remains smaller than 1; and
generate a protocol between the at least two servers for performing an intersection operation using the highest number of sequences calculated, wherein the intersection operation determines common data items stored in the at least two servers through the communications between the at least two servers such that the number of times communications are exchanged does not exceed the highest number of sequences calculated.

13. The computer program product of claim 12, wherein the highest number of sequences is defined as $O(k)$ bits where k is the maximum size of the subset of the data items in each of the at least two servers.

14. The computer program product of claim 13, wherein the maximum size of the subset of the data items is defined as n and the logarithmic function is defined as $O(k \log n)$ bits of communication.

15. The computer program product of claim 13, wherein the value of n is alterable when new data items are added and when existing data items are removed from the relational database such that O (k log n) is further calculated by the logarithmic function O (log* k) for the at least two servers.

16. The computer program product of claim 15, wherein the at least two servers deterministically exchange their inputs using only O(k log(n/k)) bits of communication.

17. The computer program product of claim 16, wherein the at least two servers hash their data items in elements of O(logk)-bit strings.

18. The computer program product of claim 17, wherein the at least two servers exchange the hashed values, in order to determine which elements are in the intersection of their data items.

19. The computer program product of claim 18, wherein the logarithmic function includes an upper bound and a lower bound in its functional calculation and the intersection operation is generated by considering both the upper bound and the lower bound in the logarithmic function.

20. A system comprising:
a memory having computer readable computer instructions; and
a processor for executing the computer readable instructions, the instructions including:
determining a maximum size of a subset of data items stored in each of at least two servers among a plurality of servers, the plurality of servers communicate with one another;
calculating a logarithm function based on the maximum size of the subset of the data items in each of the at least two servers;
calculating a highest number of sequences of communications between the at least two servers such that when the logarithmic function is iteratively calculated, a value result of the logarithmic function remains smaller than 1; and
generating a protocol between the two servers for performing an intersection operation using the highest number of sequences calculated, wherein the intersection operation determines common data items stored in the at least two servers through communications between the at least two servers such that the number of times the communications are exchanged does not exceed the highest number of sequences calculated.

* * * * *